US011135041B2

(12) United States Patent
Filsouf

(10) Patent No.: US 11,135,041 B2
(45) Date of Patent: Oct. 5, 2021

(54) FLOSSING DEVICE WITH SPRING-TYPE HEAD

(71) Applicant: Ehsan Filsouf, Toronto (CA)

(72) Inventor: Ehsan Filsouf, Toronto (CA)

( * ) Notice: Subject to any disclaimer, the term of this patent is extended or adjusted under 35 U.S.C. 154(b) by 650 days.

(21) Appl. No.: 15/986,857

(22) Filed: May 23, 2018

(65) Prior Publication Data

US 2019/0358005 A1 Nov. 28, 2019

(51) Int. Cl.
*A61C 15/04* (2006.01)

(52) U.S. Cl.
CPC .......... *A61C 15/041* (2013.01); *A61C 15/046* (2013.01)

(58) Field of Classification Search
CPC ... A61C 15/041; A61C 15/046; A61C 15/048; A61C 15/047
See application file for complete search history.

(56) References Cited

U.S. PATENT DOCUMENTS

| | | | | |
|---|---|---|---|---|
| 1,184,052 A * | 5/1916 | Turner | ................. | A61C 15/046 132/324 |
| 1,332,170 A * | 2/1920 | Elzinga | ................ | A61C 15/046 132/324 |
| 1,815,408 A * | 7/1931 | Jordan | ................. | A61C 15/046 132/323 |
| 2,650,598 A * | 9/1953 | Rodesci | ............... | A61C 15/046 132/323 |
| 3,631,869 A * | 1/1972 | Espinosa | ............. | A61C 15/048 132/323 |
| 4,013,085 A * | 3/1977 | Wright | ................ | A61C 15/046 132/323 |
| 4,827,952 A * | 5/1989 | Kos | ....................... | A61C 15/046 132/323 |
| 5,067,503 A * | 11/1991 | Stile | ..................... | A61C 15/047 132/324 |
| 6,874,509 B2 * | 4/2005 | Bergman | ............. | A61C 15/046 132/322 |
| 2008/0006289 A1 * | 1/2008 | Filsouf | ................ | A61C 15/046 132/325 |
| 2012/0180809 A1 * | 7/2012 | Bai | ...................... | A61C 15/046 132/327 |

* cited by examiner

*Primary Examiner* — Yogesh P Patel
*Assistant Examiner* — Jennifer Gill

(57) ABSTRACT

A "Flossing Device with Spring-Type Head" is a device used to floss the teeth. A handle with a storage chamber in which the coiled floss thread is stored, is fixedly attached to a Spring-Type Head that includes a substantially U-shape flexible arm and two substantially cylindrical shape fixtures. Each piece of the floss thread is placed and secured between the said fixtures. Due to the flexibility of the said arm, a constant suitable tension of the floss thread is maintained at all times. Using the device, while flossing becomes possible with one hand, it gives the user a much more effective and easier flossing experience.

21 Claims, 9 Drawing Sheets

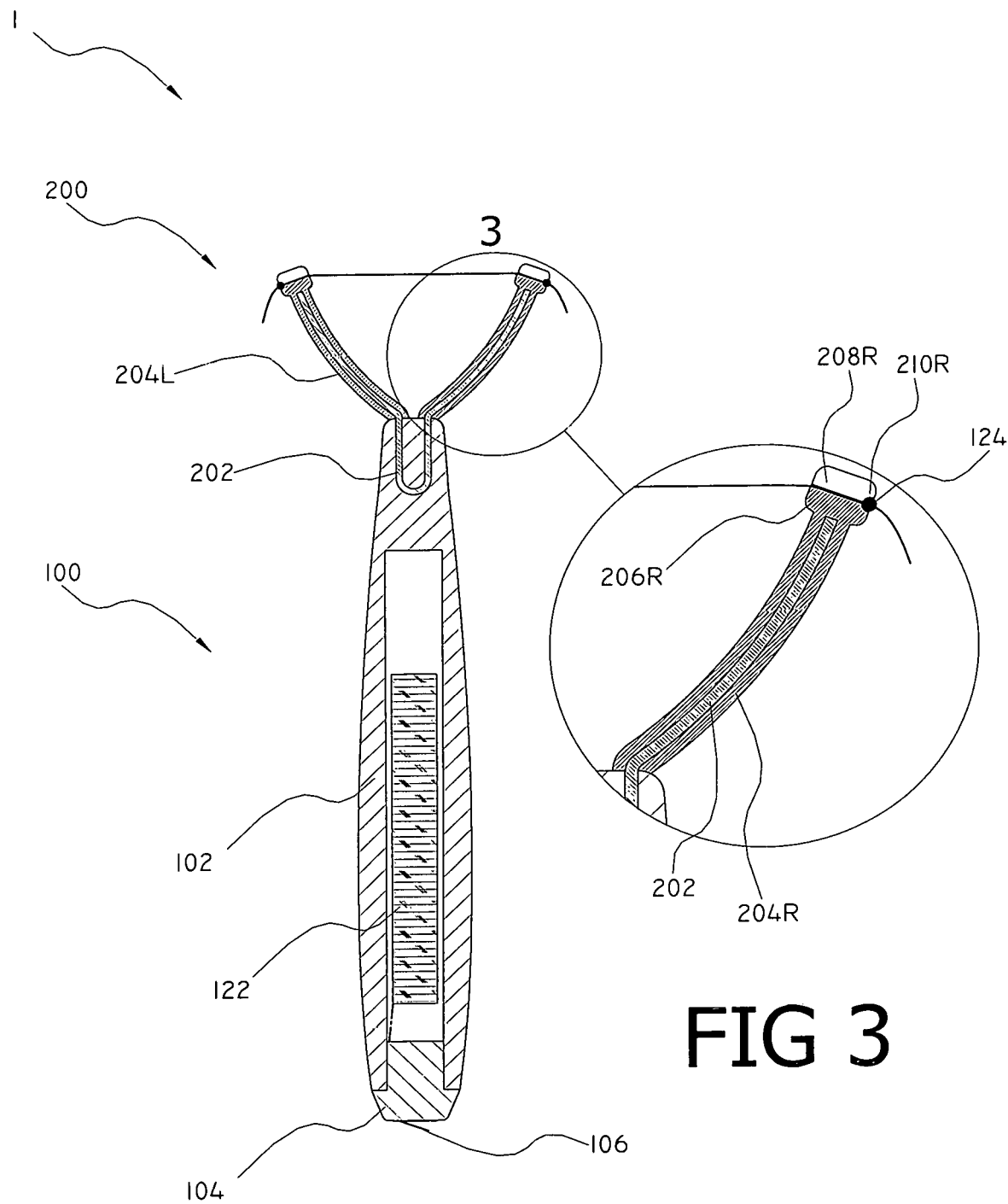

FLOSSING DEVICE WITH SPRING-TYPE HEAD

CROSS-REFERENCE TO RELATED APPLICATIONS

The present application claims priority to USPTO provisional application number 62/521,379, dated Jun. 17, 2017.

TECHNICAL FIELD

The present invention is a flossing device, and hence, it can be categorized under the technical field of devices and instruments used for improving oral health. More specifically, the invention comprises a handle with a hollow body that acts as a storage chamber in which the coiled floss thread is placed, a head that is fixedly attached to the handle and two substantially cylindrical shape fixtures on top of the two ends of the flexible head between which a piece of the floss thread is placed, secured and used for removing the food debris and particles from the spaces between the teeth of the user.

BACKGROUND ART

The devices designed and made for flossing the teeth are well-known in the art. Users have a number of problems and difficulties using the devices. These devices seem not to be adequately effective. Followings are a couple of examples of such devices can be found in the prior art.

Dental floss device with a guide post is disclosed in U.S. Pat. No. 5,289,836 A, issued to Chien-Lun Peng on Mar. 1, 1994. The device is a dental floss device with a guide post for removing food debris and dental plaque during orthodontic treatment. The guide post includes a guide post of a uniform small diameter and a floss bonded thereto. The guide post has a semi-spherical tip for sensing position to ease insertion of the guide post between the clearance which is formed by teeth and the orthodontic appliance. The dental floss device is formed by injection molding.

Given the technical details of the above invention, this flossing device has a problem that is common among numerous flossing devices previously invented or introduced to the market. The problem is the possibility of unwanted decrease of the tension of the floss thread during the flossing. The present invention, however, due to its design, does not have such technical problem, making the flossing much more effective.

U.S. Pat. No. 5,538,023 A, issued to Boguslaw Oczkowski and Ingram S. Chodorow on Jul. 23, 1996, discloses a tensioning dental flosser and method of manufacturing same that has A disposable dental floss holder for removing plaque and food debris from tooth surfaces and from the interspaces between teeth has a handle part, a bow and a length of dental floss spanning the bow. A movable element is provided which can cause a portion of the floss holder to move and tighten the strand of floss and thus momentarily reduce slack in the floss.

The invention further includes methods for manufacturing floss holders with slack in the floss, and for manufacturing floss holders with operable components for momentarily reducing slack which was designed into a flosser or which developed in the flosser due to stretching of the floss. The floss holder designs vary to include multiple bows on a single device, and to reduce the slack by moving selected parts of the bow.

Preventing the floss thread from getting slack when flossing, is in the focus of the above invention. In comparison, the present invention enjoys a simple structure and design which increases its reliability. It also offers the same feature as the above invention with much more effectiveness.

Michael Dougan, Paul Sullivan and Conor Kennedy disclose a dental floss device in the U.S. Pat. No. 7,059,334 B2, issued on Jun. 13, 2006. The device is a dental floss device that includes a handle having a head piece and a disposable holder for a length of dental floss. The holder includes a base portion and a pair of spaced-apart jaws extending from the base and which extend to embrace the head piece of the handle when the holder is in a correct alignment configuration with respect to the handle.

The device has an interlock which ensures that the holder can be inter-engaged with the head piece only when the holder is correctly aligned with the head piece. The interlock includes a head interlock part provided by interlock grooves and a holder interlock part provided by corresponding interlock tongues. There are two interlock grooves and corresponding interlock tongues which slidably inter-engage when the holder is correctly aligned with the head piece.

If the holder is turned so that it is not correctly aligned with the head piece, the interlock tongues of the holder prevent engagement of the holder with the head piece. Thus there is no risk that a user will incorrectly align and engage the dental floss holder with the head piece.

Apparently, efforts have been made in the above invention to keep the floss thread in the right position. However, in the present invention, the floss thread can have a constant suitable tension during the flossing. Using the present invention, the effectiveness of the flossing is notably increased.

SUMMARY OF INVENTION

The invention is a tensioning flossing device. This summary is not intended to be limiting as to the scope of the claims.

TECHNICAL PROBLEM

The general purpose of the embodiments of the present invention is to provide a new device to floss the teeth. The present invention is intended to increase the effectiveness of the flossing and to make the flossing easier.

In order to assist users with flossing, numerous efforts have been made so far, a couple of which were explained in the background art.

One of the important technical problems of the existing flossing devices is the unwanted decrease of the tension of the floss thread during the flossing action. The main purpose of the present invention is to eliminate this problem.

SOLUTION TO PROBLEM

The general purpose of the embodiments of the present invention is to provide a new device to floss the teeth by which the unwanted decrease of the tension of the floss thread is prevented during the flossing. The effectiveness and the ease of the flossing is considerably increased by this new flossing device.

In order to achieve the above objects and the objects stated herein below, the present invention provides a flossing device, which is composed of a hollow handle and a flexible head.

The handle is hollow and made of durable and suitable water-proof materials. The handle is further composed of a storage chamber, coiled floss thread, a floss thread indicator (a transparent portion of the body of the hollow handle which allows the user to see the inside of the storage chamber as well as the stored coiled floss thread) and a lid at the bottom of the handle. There is a narrow passage, created from a cut at the rim of the lowest part of the handle that when the lid is closed, serves as a passage for the floss thread. A cutter blade is also mounted on the outer layer of the lid for cutting the floss thread. The handle has a flat side for easier application and better control of the handle.

The flexible head is fixedly attached to the handle. It is made of suitable water-proof materials such as a suitable water-resistant spring-type metal and a spring-type metal that is coated with a suitable protective coating like plastic or chromium.

The flexible head may be fixedly attached longitudinally vertical to the handle and along with the longitudinal axis of the handle.

The flexible head may also be fixedly attached to the handle longitudinally and slightly bended comparing to the vertical longitudinal axis of the handle to increase the comfort of the user and the ease of access to the spaces and gaps between the teeth, and hence, to increase the effectiveness of the flossing.

The flexible head is further composed of a substantially U-shaped leaf spring base portion joined to two flexible arms that together form a V-shaped on the head with U-shaped leaf spring portion embedded in the distal end of the handle and two substantially enlarged cylindrical shape fixtures on top of its two ends.

There is a threading slot, cut vertically from the top side of the body of the substantially cylindrical shape fixtures up to nearly the middle of the body of the substantially cylindrical shape fixtures, wide enough just to let the floss thread to pass through the threading slot. The axes of the two threading slots are aligned with each other and with one same line.

At the exterior sides of the lowest point of the two threading slots, there are two substantially hemisphere hollow spaces to accommodate the two knots or balls on each piece of the floss thread and to secure the positioning of each piece of the floss thread between the two substantially cylindrical shape fixtures firmly and tightly.

It is noteworthy that the width of the threading slots is such that it easily let the floss thread to get in and get out of the threading slots. However, the threading slots are not wide enough to let the knots or balls on each piece of the floss thread to pass through. This feature enables the threading slots to selectively let the passage of the floss thread and to prevent the passage of the knots or balls.

In other words, the design and the sizes of the threading slots as well as the substantially hemisphere hollow spaces are such that each piece of the floss thread together with its knots or balls can easily go inside the threading slots and the substantially hemisphere hollow spaces, but cannot come out of the substantially hemisphere hollow spaces and threading slots, unintentionally.

Since the device has a flexible head, when the floss thread is placed between the two ends of the flexible head, a suitable tension of the floss thread is maintained between the two substantially cylindrical shape fixtures at every single moment.

In other words, in case the tension of the floss thread is decreased during flossing, the two ends of the flexible head react simultaneously and compensate the decrease. Therefore, the suitable tension of the floss thread is maintained automatically at all times.

The balls used on the floss thread instead of the knots can be plastic. A suitable technology —such as the method used to manufacture beaded plastic chains used to control and move window blinds—may be used to make and attach these plastic balls to the floss thread.

Moreover, as another alternative embodiment, the handle and the flexible head of the flossing device could be made and manufactured as a whole integrated embodiment. In such case, proper manufacturing methods as well as suitable and durable types of water-proof materials such as suitable plastics could be used to make and manufacture the flossing device.

It is noteworthy that due to the manufacturing method and used materials, the threading slots and substantially hemisphere hollow spaces could be positioned directly on the top of the flexible arms of the flexible head instead of having substantially cylindrical shape fixtures on top of the flexible arms and positioning the threading slots and the substantially hemisphere hollow spaces in the substantially cylindrical shape fixtures.

If the above said alternative is used, a flexibility gap may also be added to the device to enhance the flexibility of the flexible arms.

ADVANTAGEOUS EFFECTS OF INVENTION

It is the principal object of the invention to provide an easier and more effective flossing to the users.

Accordingly, using its flexible head, the device maintains a suitable tension of the floss thread constantly while flossing.

In addition, a handle that is made of suitable and durable water-proof materials is fixedly attached to the flexible head. The handle has an ergonomic design.

Therefore, comparing to the conventional methods and devices, the user can experience an easier and more effective flossing and will be able to use only one hand to remove food debris even from hard-to-reach spaces and gaps between the teeth.

In accordance with the principal object of the invention, the flexible head is further composed of a substantially U-shape flexible arm and two substantially cylindrical shape fixtures on top of the two ends of the substantially U-shape flexible arm.

Moreover, there is a threading slot, cut vertically from the top side of the body of the substantially cylindrical shape fixtures up to nearly the middle of the body of the substantially cylindrical shape fixtures.

In addition, at the exterior sides of the lowest point of the two threading slots, there are two substantially hemisphere hollow spaces.

The threading slots and substantially hemisphere hollow spaces are to accommodate the two knots or balls on each piece of the floss thread and to secure the positioning of each piece of the floss thread between the two substantially cylindrical shape fixtures firmly and tightly.

It is one of the objects of the invention to have a handle with an ergonomic design and suitable shape and size.

It is an object of the invention to have the handle with one flat side for easier grip and better control of the device.

It is also an object of the invention to have the flat side of the handle so that it would help the user to determine the direction and positioning of the flexible head of the device inside the mouth space when flossing, enabling the user to move the flexible head inside the mouth space with more precision.

It is one of the objects of the invention to have a storage chamber inside the handle to store the floss thread that is coiled in a substantially cylindrical shape.

It is another object of the invention that the coiled floss thread is uncoiled from the inner side of the coil to ensure the smooth uncoiling of the floss thread.

It is an object of the invention to have a lid at the bottom of the handle to make the refill of the coiled floss thread inside the storage chamber possible.

It is an additional object of the invention to have a narrow passage, created from a cut at the rim of the lowest part of the handle that when the lid is closed, serves as a passage for the floss thread so that the floss thread could be pulled out of the storage chamber through the passage.

It is an object of the invention to have a cutter blade on the outer layer of the lid to cut the floss thread.

It is also an object of the invention to have a floss thread indicator on the body of the handle so that the user could easily determine that how much coiled floss thread is left in the storage chamber.

It is another object of the invention to make the flexible head from suitable water-proof materials such as flexible plastic, a resistant spring type metal and a spring type metal coated with a suitable coating like chromium or plastic.

It is one of the objects of the invention to have two substantially cylindrical shape fixtures on top of the two ends of the substantially U-shape flexible arm of the flexible head of the flossing device.

It is an object of the invention to have a threading slot, cut vertically from the top side of the body of each of the substantially cylindrical shape fixtures up to nearly the middle of the body of each of the substantially cylindrical shape fixtures, wide enough just to let the floss thread to pass through the threading slots.

It is another object of the invention that the axes of the two threading slots are aligned with each other in one line.

It is one of the objects of the invention to have two substantially hemisphere hallow spaces at the exterior sides of the lowest point of the two threading slots to accommodate the two knots on each piece of the floss thread and to secure the positioning of each piece of the floss thread between the two substantially cylindrical shape fixtures, firmly and tightly.

It is another object of the invention that the width of the threading slots is such that it easily let the floss thread to get in and get out of the threading slots.

It is one of the objects of the invention that the threading slots are not wide enough to let the knots on each piece of the floss thread to pass through.

It is another object of the invention that the threading slots and the substantially hemisphere hollow spaces selectively let the passage of the floss thread and prevent the passage of the knots.

It is an object of the invention that the design and the sizes of the threading slots as well as the substantially hemisphere hollow spaces would be such that each piece of the floss thread together with its knots can easily go inside the threading slots and the substantially hemisphere hollow spaces, but cannot come out of the substantially hemisphere hollow spaces and the threading slots, unintentionally.

It is one of the objects of the invention that each piece of the floss thread, when is placed and secured between the two fixtures, is parallel to the surface of the flat side of the handle.

It is also an object of the invention to thread and securely position the floss thread between the two substantially cylindrical shape fixtures on top of the two ends of the substantially U-shape flexible arm of the flexible head through the threading slots and the substantially hemisphere hollow spaces while a suitable tension of the floss thread is continuously maintained.

It is another object of the invention that as an alternative embodiment, USC plastic balls can be used on the floss thread instead of the knots. A suitable technology—such as the method used to manufacture beaded plastic chains used to control and move window blinds—may be used to make and attach these plastic balls to the floss thread.

It is an additional object of the invention that as an alternative embodiment, the handle and the flexible head of the flossing device could be made and manufactured as a whole integrated embodiment. In such case, proper manufacturing methods as well as suitable and durable types of water-proof materials such as suitable plastics could be used to make and manufacture the flossing device. Moreover, due to the manufacturing method and used materials, the threading slots and substantially hemisphere hollow spaces could be positioned directly on the top of the flexible arms of the flexible head instead of having substantially cylindrical shape fixtures on top of the flexible arms and positioning the threading slots and the substantially hemisphere hollow spaces in the substantially cylindrical shape fixtures.

BRIEF DESCRIPTION OF DRAWINGS

Various other objects, features and advantages of the present invention will become more fully appreciated as the same becomes better understood when considered in conjunction with the accompanying drawings in which the same or its parts throughout the several views are shown. It is noteworthy that the accompanying drawings of the present invention are not scaled. The brief description of the drawings are as follows:

FIG. 2 is a cross sectional view of the flossing device as shown at line 2-2 of FIG. 1 while the storage chamber and the substantially U-shape flexible arm can be seen in the view.

FIG. 3 is a magnified view of the area 3 in FIG. 2. The flexible arm, its coating and the corresponding fixture can be seen in the view.

DESCRIPTION OF EMBODIMENTS

Figure 1:
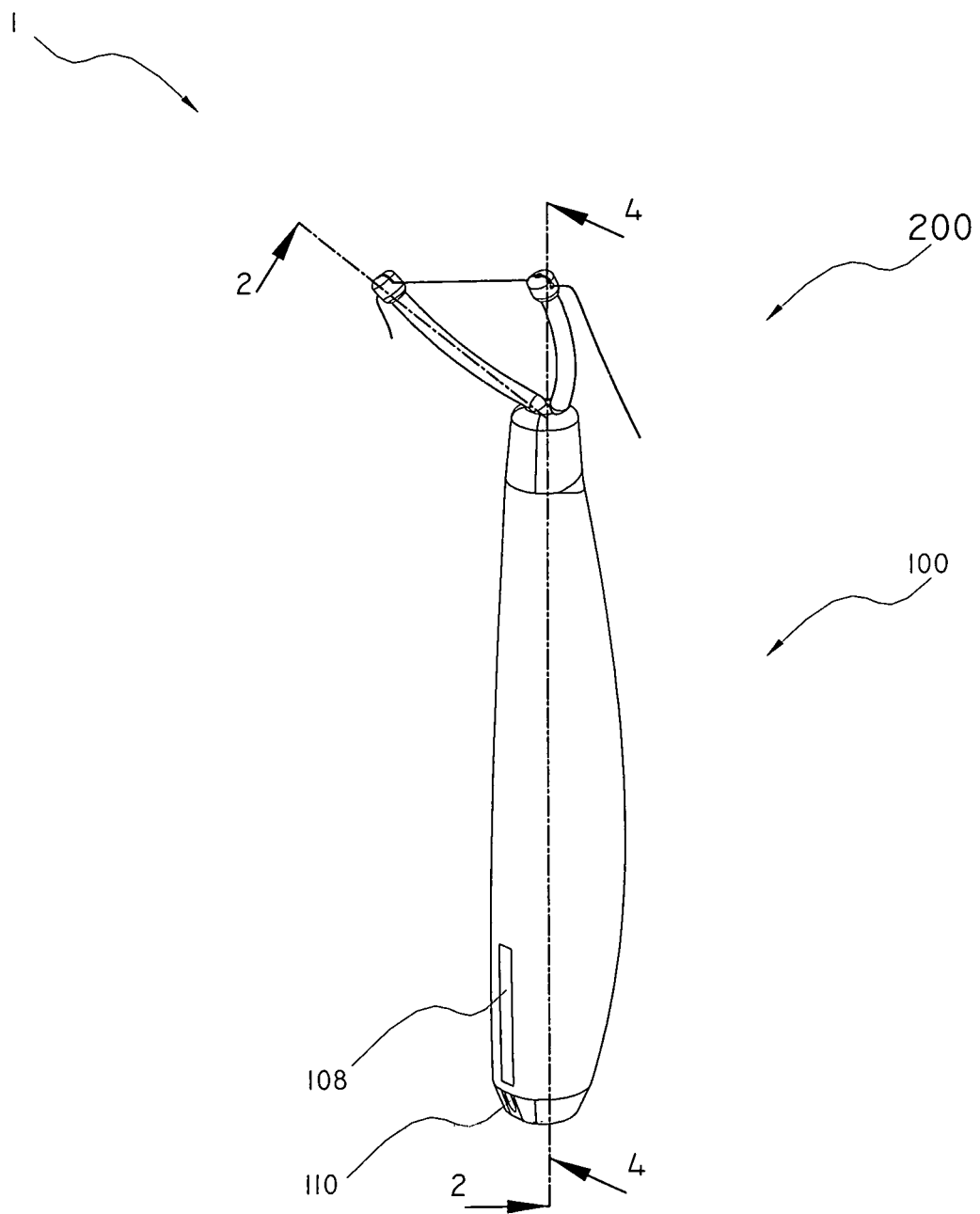
FIG. 1 is a perspective view of the flossing device.
Figure 4:
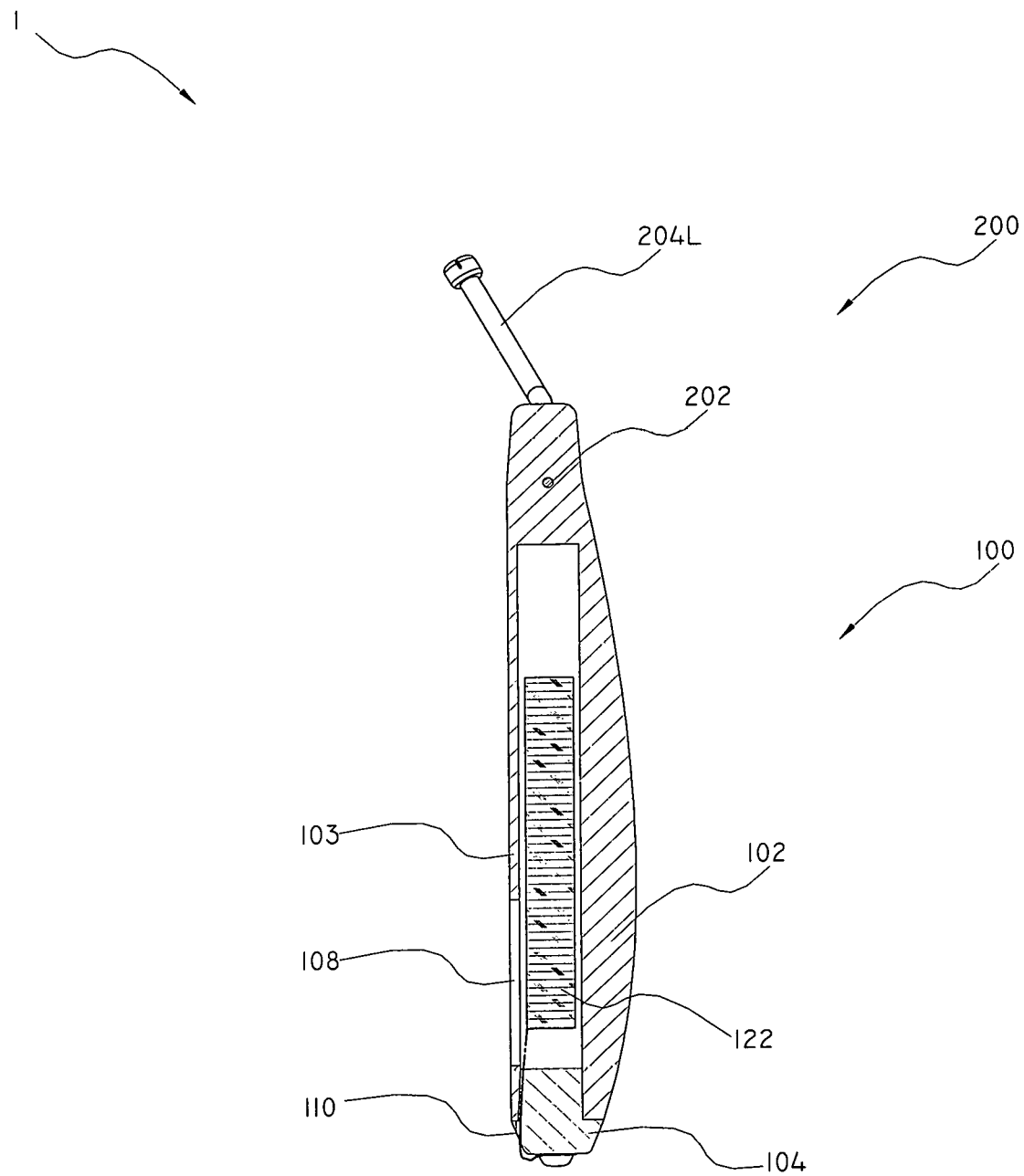
FIG. 4 is a cross sectional view of the flossing device as shown at line 4-4 of FIG. 1 while the storage chamber and the substantially U-shape flexible arm can be seen in the view.
Figure 5:
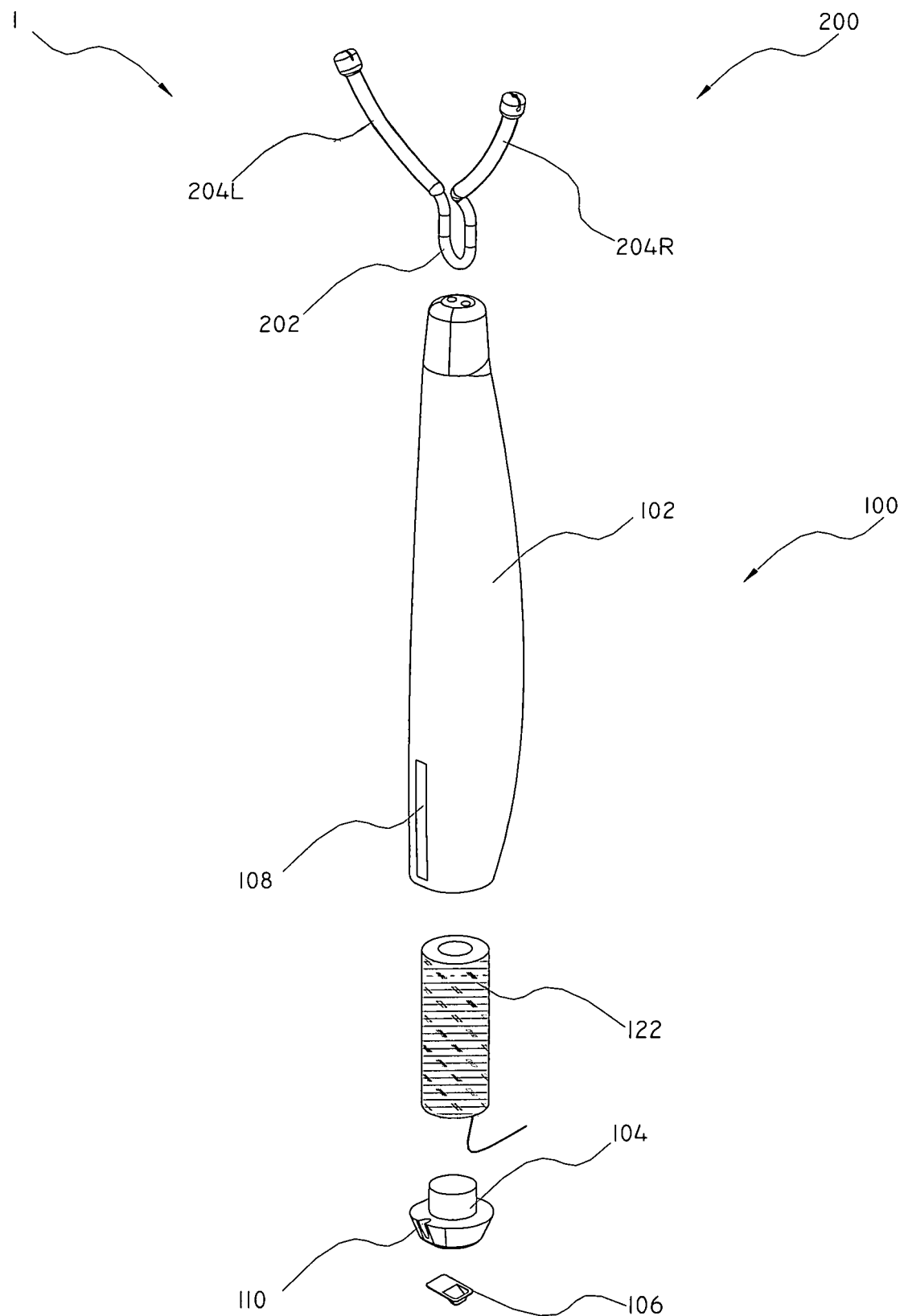
FIG. 5 is the exploded view of the flossing device.
Figures 6, 7:
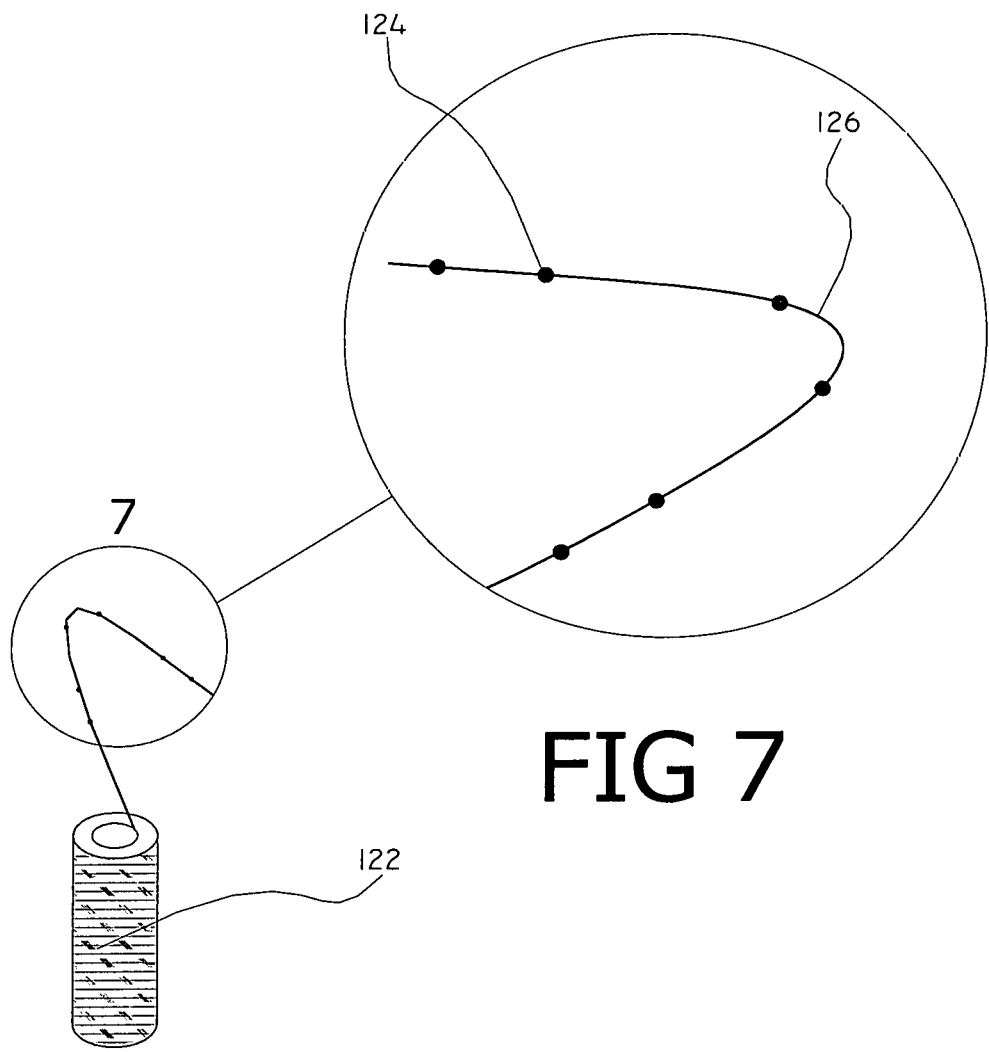
FIG. 6 is the perspective view of the coiled floss thread. The coiled floss thread is being uncoiled and the knots on the floss thread can be seen in the view.
FIG. 7 is the magnified view of the area 7 in FIG. 6. The knots on each piece of the floss thread can be seen in the magnified view.
Figure 8:
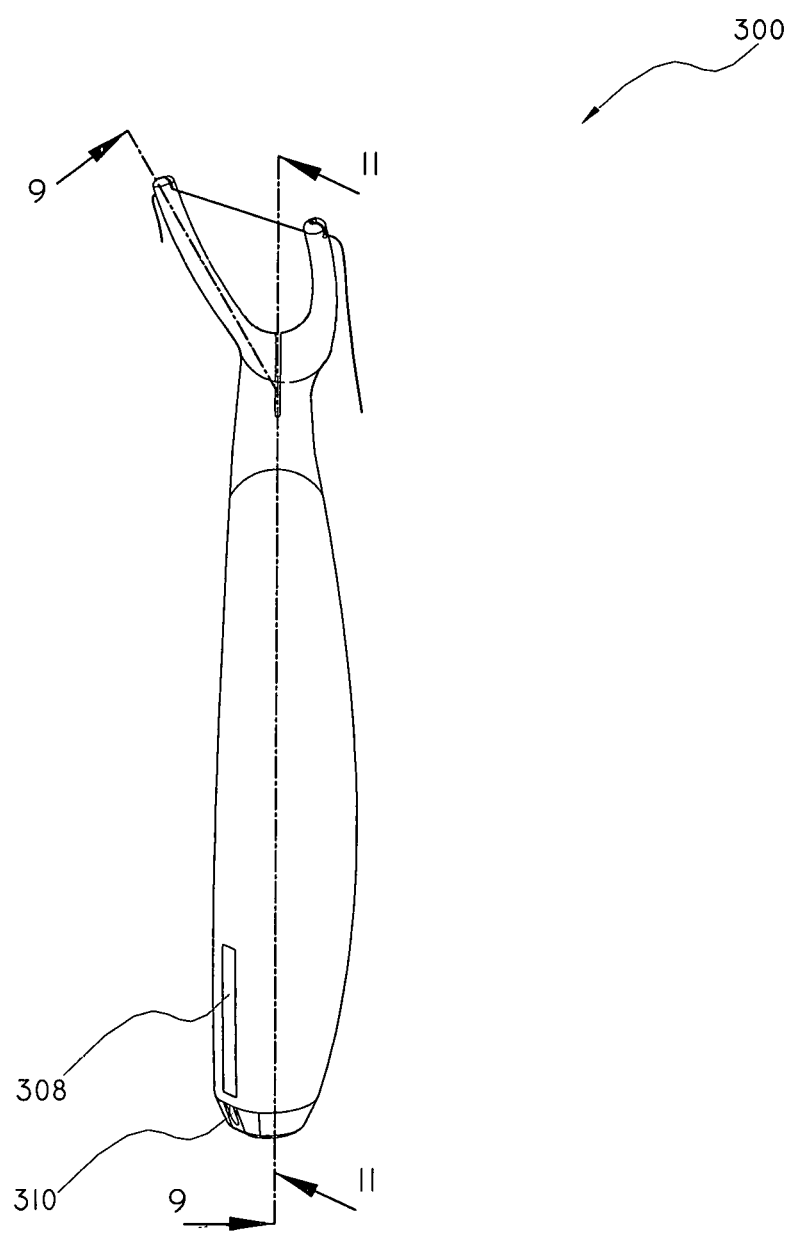
FIG. 8 is the perspective view of the flossing device while as an alternative, the flexible head and the handle are made as a whole integrated embodiment.
Figures 9, 10:
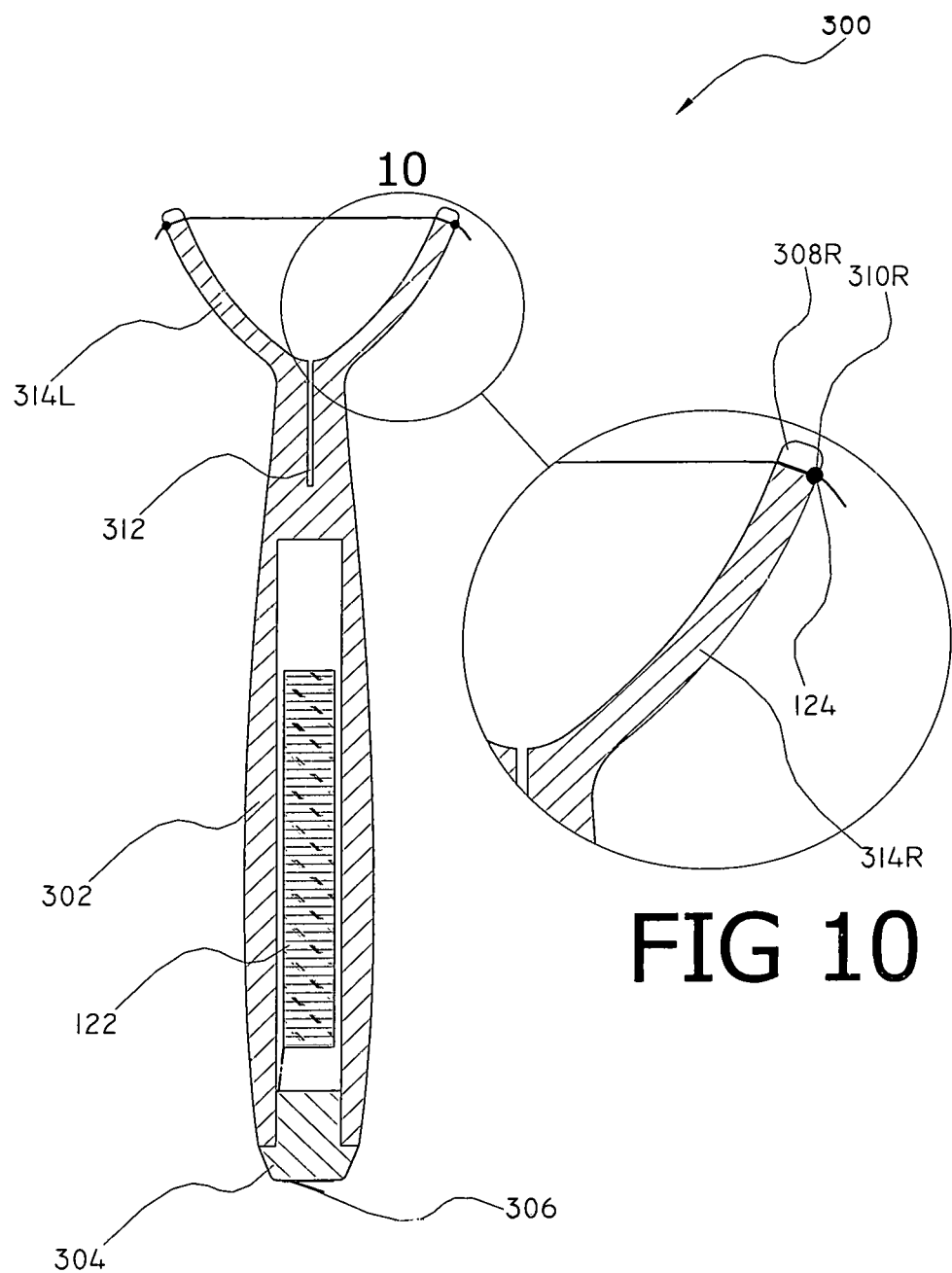
FIG. 9 is a cross sectional view of the flossing device as shown at line 9-9 of FIG. 8 while as an alternative, the flexible head and the handle are made as a whole integrated embodiment. The storage chamber and the flexible arms can be seen in the view.
FIG. 10 is a magnified view of the area 10 in FIG. 9. The flexible arm can be seen in the view.
Figure 11:
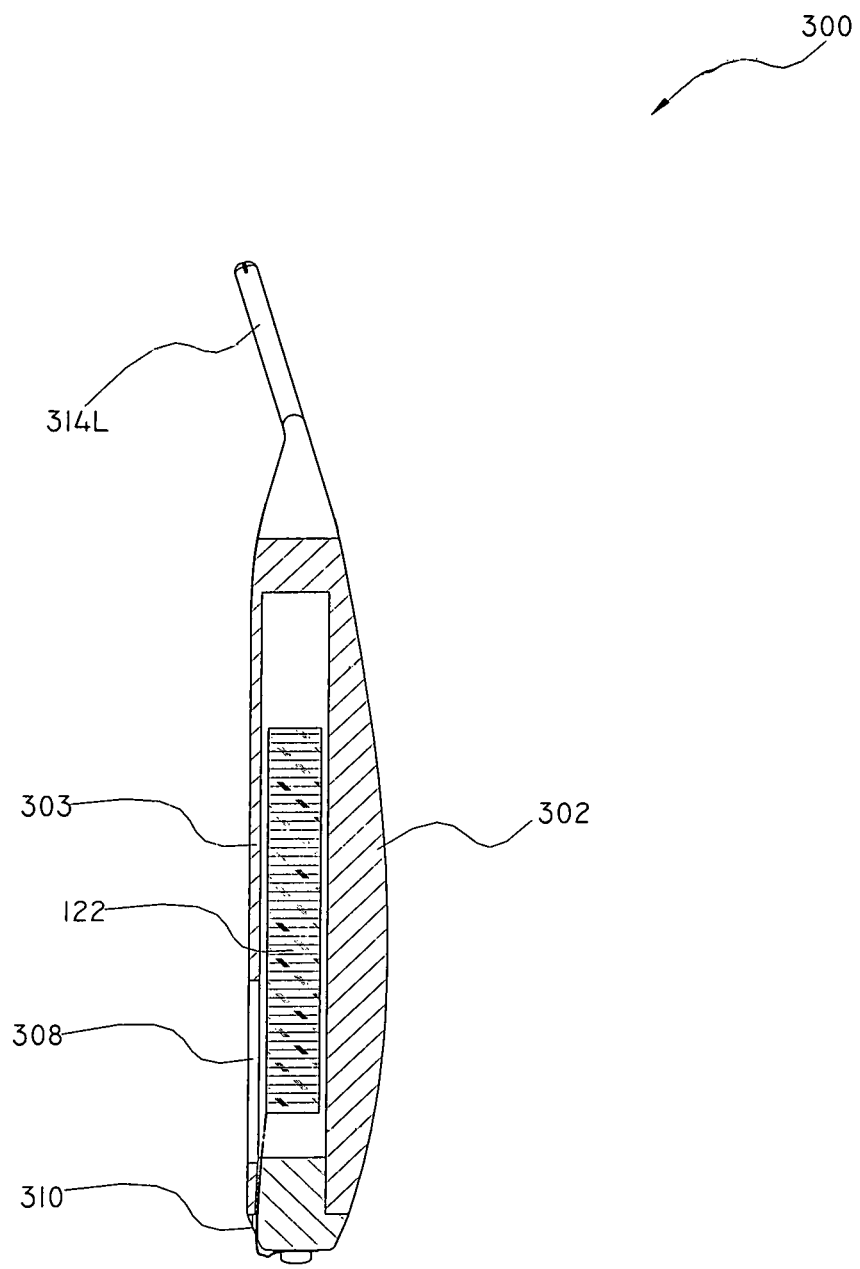
FIG. 11 is a cross sectional view of the flossing device as shown at line 11-11 of FIG. 8 while as an alternative, the flexible head and the handle are made as a whole integrated embodiment. The storage chamber and the flexible arms can be seen in the view.
Figure 12:
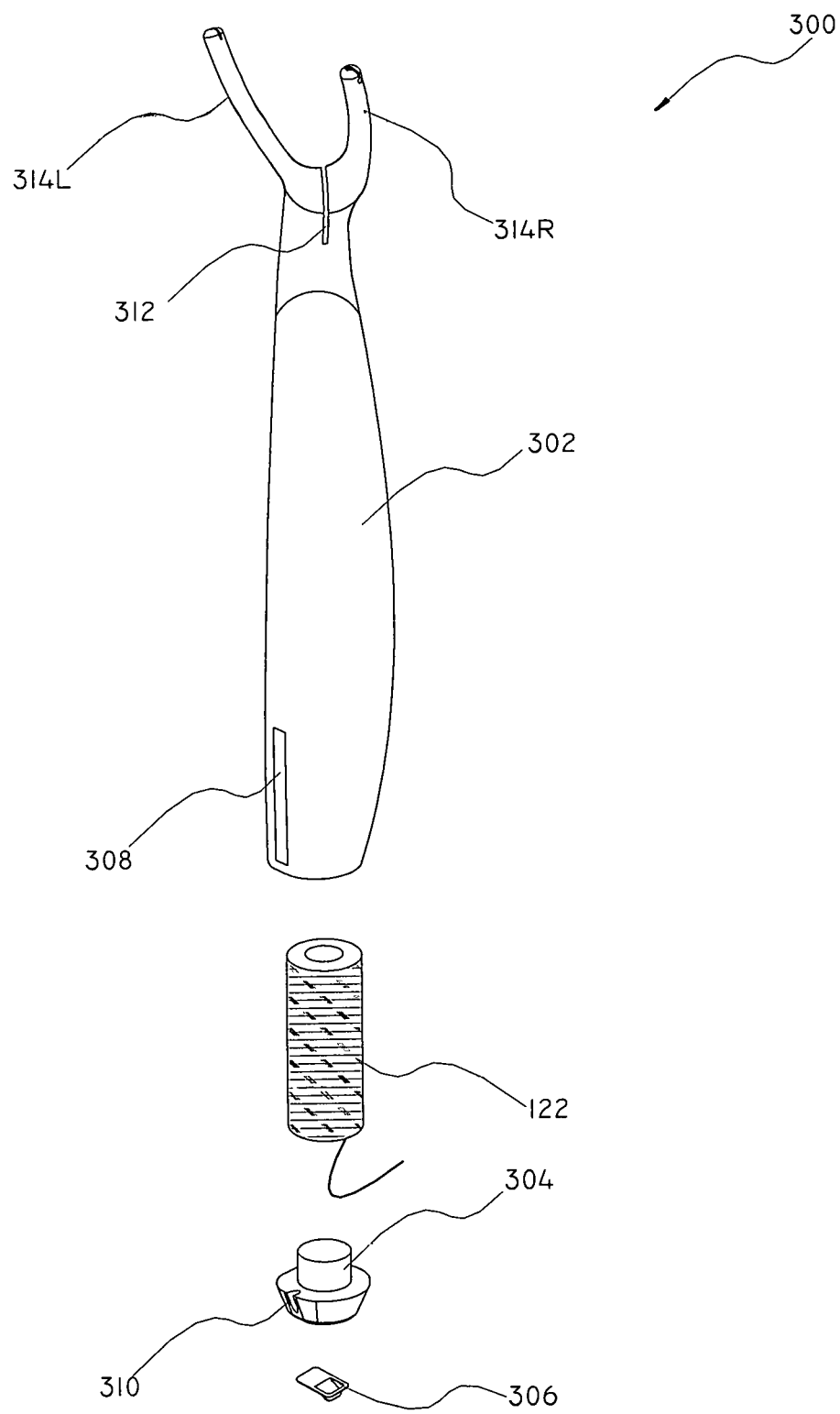
FIG. 12 is the exploded view of the flossing device while as an alternative, the flexible head and the handle are made as a whole integrated embodiment.

The flossing device 1 generally presented in FIG. 1, includes a handle 100 and a flexible head 200.

As shown in FIGS. 1, 2, 4 and 3, the handle 100 is hollow and made of suitable and durable water-proof materials. The handle 100 has an ergonomic design.

The handle 100 has a flat side 103 for easier grip and better control of the flossing device 1. The flat side 103 helps the user to determine the direction and positioning of the flexible head 200 of the flossing device 1 inside the mouth space when flossing, enabling the user to move the flexible head 200 inside the mouth space with more precision and comfort.

The handle 100 is further composed of a storage chamber 102, coiled floss thread 122 (that has no core in its center) and a lid 104 at the bottom of the handle 100. There is a narrow passage 110, created from a cut at the rim of the lowest part of the handle 100 that when the lid 104 is closed, serves as a passage for the floss thread 126. Using the lid 104, the refill of the coiled floss thread 122 in the storage chamber 102 becomes possible.

The handle 100 is also composed of a floss thread indicator 108 that is a transparent portion of the body of the handle 100 which allows the user to see the inside of the storage chamber 102 as well as the stored coiled floss thread 122.

The coiled floss thread 122 is uncoiled from inner side of the center of the coiled floss thread 122 to prevent any accidental disturbance of the uncoiling process and to ensure the smooth uncoiling of the coiled floss thread 122. There is a cutter blade 106 on the outer layer of the lid 104 for cutting the floss thread 126.

Along the floss thread 126, there are numerous knots 124 on the floss thread 126 in specific and designated intervals. Two consequent knots 124, a short length of the floss thread 126 before the first and after the second said consequent knots 124 and the floss thread 126 between them form a piece of the floss thread 126.

Using the cutter 106, the user can cut a piece of the floss thread 126 including two knots 124 on each piece of the floss thread 126 and use it for flossing. The knots 124 are necessary to secure each piece of the floss thread 126 in its right position.

The flexible head 200 may be fixedly attached to the handle 100 longitudinally vertical and along with the longitudinal axis of the handle.

The flexible head 200 may also be fixedly attached to the handle 100 longitudinally and slightly bended comparing to the vertical longitudinal axis of the handle to increase the comfort of the user and the ease of access to the spaces and gaps between the teeth, and hence, to increase the effectiveness of the flossing.

The flexible head 200 is made of suitable water-proof materials such as a suitable water- resistant spring-type metal and a spring-type metal that is coated with a suitable protective coating like plastic or chromium.

As shown in FIGS. 1, 2, 3, 4 and 5, the flexible head 200 is further composed of a substantially U-shape flexible arm 202 and two substantially cylindrical shape fixtures 206L and 206R on top of its two ends.

There is a threading slot 208L or 208R, cut vertically from the top side of the body of the substantially cylindrical shape fixtures up to nearly the middle of the body of the substantially cylindrical shape fixtures 206L and 206R, wide enough just to let the floss thread 126 to pass through the threading slots 208L and 208R. The axes of the two threading slots 208L and 208R are aligned with each other in one line.

At the exterior sides of the lowest point of the two threading slots 208L and 208R, there are two substantially hemisphere hollow spaces 210L and 210R to accommodate the two knots 124 on each piece of the floss thread 126 and to secure the positioning of each piece of the floss thread 126 between the two substantially cylindrical shape fixtures 206L and 206R firmly and tightly.

It is noteworthy that the width of the threading slots 208L and 208R is such that it easily let the floss thread 126 to get in and get out of the threading slots 208L and 208R. However, the threading slots 208L and 208R are not wide enough to let the knots 124 on each piece of the floss thread 126 to pass through. This feature enables the threading slots 208L and 208R and the substantially hemisphere hollow spaces 210L and 210R to selectively let the passage of the floss thread 126 and to prevent the passage of the knots 124.

In other words, the design and the sizes of the threading slots 208L and 208R as well as the substantially hemisphere hollow spaces 210L and 210R are such that each piece of the floss thread 126 together with its knots 124 can easily go inside the threading slots 208L and 208R and the substantially hemisphere hollow spaces 210L and 210R, but cannot come out of the substantially hemisphere hollow spaces 210L and 210R and the threading slots 208L and 208R, unintentionally.

In operation, in the first step, a desired length of the floss thread 126 with two knots or balls is pulled out of the storage chamber 102 through the passage 110 and using the cutter blade 106, it is cut by the user.

Then, pushing the two ends of the substantially U-shape flexible arm 202 towards each other and holding them, the user is required to thread one of the two ends of the floss thread 126 through one of the two threading slots 208L or 208R and secure the corresponding knot 124 in the corresponding substantially hemisphere hollow space 210L or 210R.

After doing so, and still holding the two ends of the substantially U-shape flexible arm 202, the user is required to thread the other end of the floss thread 126 through the other threading slots 208L or 208R and secure the corresponding knot 124 in the corresponding substantially hemisphere hollow space 210L or 210R.

Then the user is now required to release the two ends of the substantially U-shape flexible arm 202. As a result, the floss thread 126 becomes snug and taut between the two substantially cylindrical shape fixtures 206L and 206R with a suitable tension.

The flossing device is now ready to floss the teeth. When one piece of the floss thread 126, secured between the two substantially cylindrical shape fixtures 206L and 206R, is used and needs replacement with a fresh piece of the floss thread 126, the used piece of the floss thread 126 can be removed by pushing and holding the two ends of the substantially U-shape flexible arm 202 again and removal of the used piece of the floss thread 126. Then, a new piece of the floss thread 126 can be placed in the right position in the same manner described above, for flossing.

Referring to FIGS. 8, 9, 10, 11 and 12, as an alternative embodiment, the handle 100 and the flexible head 200 in the above described embodiments may be designed and manufactured as a whole integrated embodiment. In such case, suitable and durable water-proof materials such as suitable types of plastic should be used to comply with the manufacturing method requirements.

In addition, due to the method of manufacturing and the materials used, there is no need to the substantially cylindrical shape fixtures. Instead, the threading slots 308L and 308R as well as the substantially hemisphere hollow spaces 310L and 310R can be designed and made directly on the flexible arms 314L and 314R.

Moreover, a flexibility gap 312 is also added to the device to enhance the flexibility of the flexible arms 314L and 314R.

What is claimed is:

1. A flossing device comprising:
    a handle extending along a longitudinal axis from a closed distal end of the handle to an open proximal end of the handle, the open proximal end of the handle forming an opening to a hollow interior of the handle with the hollow interior forming a storage chamber;
    a coiled supply of floss stored within the storage chamber;
    a lid attached to, and closing, the opening at the proximal end of the handle thereby securing the coiled supply of floss in the storage chamber;
    a monolithic V-shaped floss head non-removably attached to the distal end of the handle, the V-shaped floss head including:
        a pair of cylindrical plastic coated metal arms forming the V-shape;
        a U-shaped metal leaf spring directly attaching said pair of cylindrical arms together, wherein the U-shaped metal leaf spring is embedded in the distal end of the handle;
        the pair of cylindrical arms projecting from the distal end of the handle, and wherein each of said arms includes a floss threading slot with a hemispherical hollow space at one end of the slot.

2. The flossing device of claim 1, further comprising a transparent window on the handle forming a floss indicator and allowing a user to see into the storage chamber to view the coiled supply of floss when the lid is closed over the opening.

3. The flossing device of claim 1, wherein the lid includes a passage allowing an end of the coiled supply of floss to exit the storage chamber.

4. The flossing device of claim 1, wherein each of said arms includes an enlarged cylindrical fixture at a distal-most end of the respective arm and wherein the enlarged cylindrical fixture carries the floss threading slot and hemispherical space.

5. The flossing device of claim 1, wherein the coiled supply of floss comprises a plurality of knots or plastic balls along a length of the floss and the knots or plastic balls are received in the hemispherical hollow spaces.

6. The flossing device of claim 1, wherein the handle is made of a waterproof material.

7. The flossing device of claim 1, wherein the handle is ergonomic and has at least one flat side for easier grip.

8. The flossing device of claim 1, wherein the lid comprises a blade for cutting a length of the coiled floss supply.

9. The flossing device of claim 1, wherein the handle is made of plastic.

10. The flossing device of claim 1, wherein each arm of the pair of arms is positioned at an acute angle to the longitudinal axis.

11. The flossing device of claim 4, wherein the coiled supply of floss comprises a plurality of knots or plastic balls along a length of the floss and the knots or plastic balls are received in the hemispherical hollow spaces.

12. The flossing device of claim 4, wherein the handle is made of plastic.

13. The flossing device of claim 4, wherein the handle is erogonomic and has at least one flat side for easier grip.

14. The flossing device of claim 4, wherein the lid comprises a blade for cutting a length of the coiled floss supply.

15. The flossing device of claim 4, further comprising a transparent window on the handle forming a floss indicator and allowing a user to see into the storage chamber to view the coiled supply of floss when the lid is closed over the opening.

16. The flossing device of claim 4, wherein the lid includes a passage allowing an end of the coiled supply of floss to exit the storage chamber.

17. The flossing device of claim 5, wherein the knots or plastic balls are sized larger than a width of the floss threading slots, such that the knots or plastic balls cannot pass through the floss threading slots.

18. The flossing device of claim 11, wherein the knots or plastic balls are sized larger than a width of the floss threading slots, such that the knots or plastic balls cannot pass through the floss threading slots.

19. The following device of claim 15, wherein the coiled supply of floss comprises a plurality of knots or plastic balls along a length of the floss and the knots or plastic balls are received in the hemispherical hollow spaces.

20. The flossing device of claim 16, whererin the lid comprises a blade for cutting a length of the coiled floss supply.

21. The flossing device of claim 19, wherein the knots or plastic balls are sized larger than a width of the floss threading slots, such that the knots or plastic balls cannot pass through the floss threading slots.

* * * * *